(12) United States Patent
Lee et al.

(10) Patent No.: US 8,812,441 B2
(45) Date of Patent: Aug. 19, 2014

(54) MIGRATION APPARATUS WHICH CONVERT DATABASE OF MAINFRAME SYSTEM INTO DATABASE OF OPEN SYSTEM AND METHOD FOR THEREOF

(75) Inventors: Kang Ho Lee, Seoul (KR); Seong Bin Im, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 337 days.

(21) Appl. No.: 12/445,567

(22) PCT Filed: Dec. 8, 2006

(86) PCT No.: PCT/KR2006/005330
§ 371 (c)(1),
(2), (4) Date: Oct. 8, 2009

(87) PCT Pub. No.: WO2008/047974
PCT Pub. Date: Apr. 24, 2008

(65) Prior Publication Data
US 2010/0088353 A1  Apr. 8, 2010

(30) Foreign Application Priority Data
Oct. 17, 2006  (KR) .................. 10-2006-0100780

(51) Int. Cl.
*G06F 17/30* (2006.01)
(52) U.S. Cl.
CPC ........ *G06F 17/30079* (2013.01); *G06F 17/303* (2013.01); *G06F 17/30569* (2013.01); *Y10S 707/975* (2013.01)
USPC ............................ 707/635; 707/809; 707/975
(58) Field of Classification Search
CPC ............ G06F 17/30079; G06F 17/303; G06F 17/30569
USPC .......................................... 707/635, 809, 975
See application file for complete search history.

(56) References Cited

U.S. PATENT DOCUMENTS

| 6,151,608 A | 11/2000 | Abrams | |
|---|---|---|---|
| 6,400,287 B1 * | 6/2002 | Ehrman | 341/55 |
| 6,469,643 B1 * | 10/2002 | Suzuki et al. | 341/50 |
| 2003/0004972 A1 * | 1/2003 | Winokur | 707/200 |
| 2005/0005091 A1 * | 1/2005 | Suzuki | 713/150 |

OTHER PUBLICATIONS

Schaffer et al., Migrating Resource Commitment from Mainframe to PC, IEEE Computer Applications in Power, Jan. 1994, 14-19, 7-1.
Jiang et al., Data Conversion for Process/Thread Migration and Checkpointing, Proceedings of the 2003 International Conference on Parallel Processing, 2003, IEEE.

* cited by examiner

*Primary Examiner* — Alicia Lewis
(74) *Attorney, Agent, or Firm* — The Webb Law Firm

(57) ABSTRACT

Provided are a migration apparatus and method for converting a database of a mainframe system into an appropriate database for an open system. The migration apparatus includes: a data extraction module connected with a database of the mainframe system and extracting data composed of Extended Binary Coded Decimal Interchange Code (EBCDIC) in binary format; a code conversion module converting the extracted EBCDIC data into American Standard Code for Information Interchange (ASCII) code, full-width characters being converted into half-width characters corresponding to ASCII code using a previously set full-width/half-width conversion table; and a data transfer module transferring the data converted into ASCII code to store it in a database previously built in the open system to correspond to the database of the mainframe system. The migration apparatus and method efficiently reuse a conventionally used database via the rehosting process of converting a mainframe system into an open system.

5 Claims, 2 Drawing Sheets

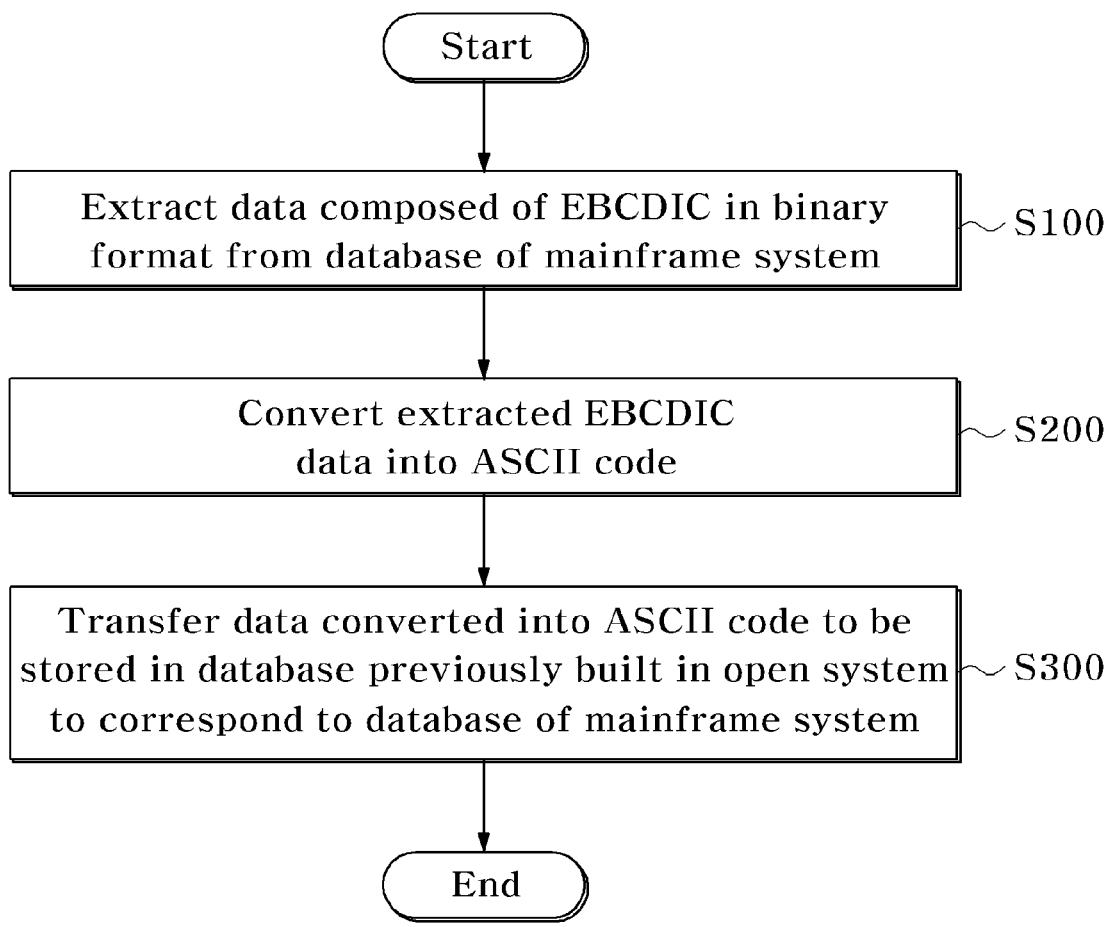

MIGRATION APPARATUS WHICH CONVERT DATABASE OF MAINFRAME SYSTEM INTO DATABASE OF OPEN SYSTEM AND METHOD FOR THEREOF

TECHNICAL FIELD

The present invention relates to a migration apparatus and method reusing and converting a database used in a mainframe system into an appropriate database for an open system.

BACKGROUND ART

In general, mainframe systems have been used to process data within large corporations and governmental organizations.

The term, mainframe system, is industrial terminology indicating a large-scale computer manufactured by a large company, e.g., IBM Corporation. Mainframe systems are mainly used for performing computations required for the business activities of large companies, such as large corporations and financial institutions, and are configured according to a centralized computing method rather than a distributed computing method.

The cost of such a mainframe system is high and rapidly increases every year. For this reason, mainframe system environments are recently being replaced by open system environments, e.g., UNIX or Linux, which are designed to enable linkage between hardware (H/W) and software (S/W) of different computer manufacturing companies, and so on.

However, totally reestablishing a conventionally used mainframe system environment as an open system environment is very costly and takes a long time.

To solve these problems, rehosting solutions have lately been developed which, when converting a mainframe system environment into an open system environment, do not reestablish the entire system but convert H/W and S/W in the conventional mainframe system environment into H/W and S/W in an open system environment using middleware, a compiler solution, etc., and reuse the H/W and S/W by a migration operation of an application program and data.

According to such rehosting solutions, however, during the migration operation of a database, many errors occur due to a difference between code systems applied to a mainframe system and an open system.

DISCLOSURE OF INVENTION

Technical Problem

The present invention is directed to a migration apparatus and method that minimize errors due to difference between code systems and more rapidly convert a database used in a mainframe system into an appropriate database for an open system.

Technical Solution

One aspect of the present invention provides a migration apparatus for converting a database of a mainframe system into an appropriate database for an open system, the migration apparatus comprising: a data extraction module connected with a database of the mainframe system and extracting data composed of Extended Binary Coded Decimal Interchange Code (EBCDIC) in binary format; a code conversion module converting the extracted EBCDIC data into American Standard Code for Information Interchange (ASCII) code, full-width characters being converted into half-width characters corresponding to ASCII code using a previously set full-width/half-width conversion table; and a data transfer module transferring the data converted into ASCII code to store it in a database previously built in the open system to correspond to the database of the mainframe system.

Here, the mainframe system may be a mainframe environment of IBM Corporation, and the open system may be a UNIX environment.

The code conversion module may convert a value of X'00' into an ASCII code corresponding to SPACE(X'20') during code conversion.

The code conversion module may convert a character string including shift-outs (SOs) and shift-ins (SIs) by removing the SOs and the SIs from the character string and then moving letters behind the SOs forward to fill empty spaces leftover by removing the SOs and the SIs during code conversion.

The code conversion module may convert special characters, e.g., CR, LF, ^, >, <, +, \, [ and ], to correspond to ASCII code using a previously set special-character code conversion table.

Another aspect of the present invention provides a migration method of converting a database of a mainframe system into an appropriate database for an open system, the migration method comprising the steps of: (a) extracting data composed of EBCDIC in binary format from a database of the mainframe system; (b) converting the extracted EBCDIC data into ASCII code, full-width characters being converted into half-width characters corresponding to ASCII code using a previously set full-width/half-width conversion table; and (c) transferring the data converted into ASCII code to store it in a database previously built in the open system to correspond to the database of the mainframe system.

Still another aspect of the present invention provides a recording medium recording a program for executing the above-described migration method of converting a database of a mainframe system into an appropriate database for an open system.

Advantageous Effects

According to the inventive migration apparatus and method for converting a database of a mainframe system into an appropriate database for an open system, it is possible to minimize errors due to difference in code system and more rapidly convert a database, e.g., DB2, used in the mainframe system, into an appropriate database, e.g., Oracle, for the open system.

It is also possible to efficiently reuse a conventionally used database, e.g., DB2, via the rehosting process of converting a mainframe system into an open system.

BRIEF DESCRIPTION OF THE DRAWINGS

FIG. 2 is a flowchart illustrating a migration method of converting a database of a mainframe system into an appropriate database for an open system according to an exemplary embodiment of the present invention.

MODE FOR THE INVENTION

Figure 1:
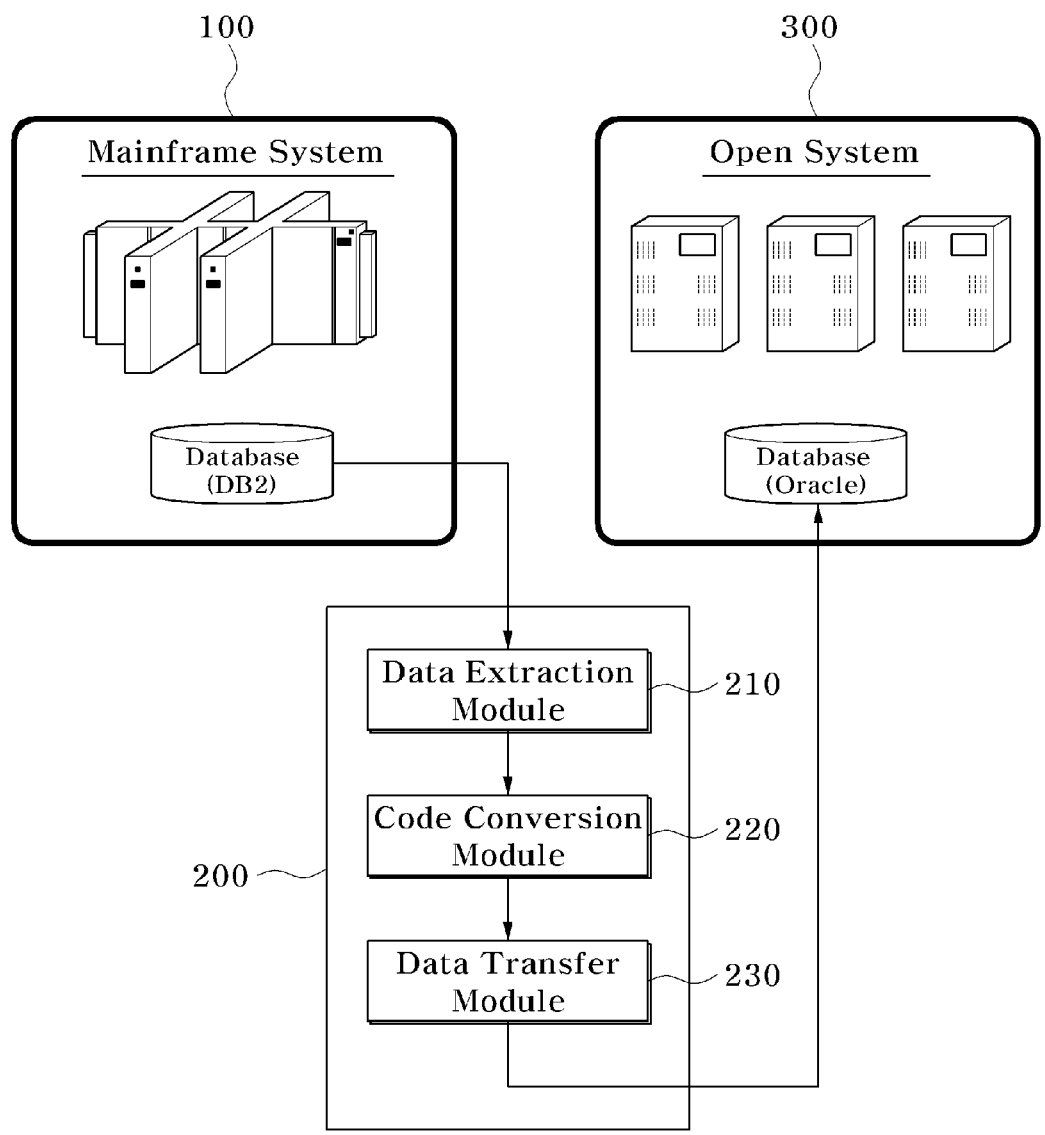
FIG. 1 is a block diagram schematically illustrating a migration apparatus for converting a database of a mainframe system into an appropriate database for an open system according to an exemplary embodiment of the present invention.

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

FIG. 1 is a block diagram schematically illustrating a migration apparatus for converting a database of a mainframe system into an appropriate database for an open system according to an exemplary embodiment of the present invention.

Referring to FIG. 1, a migration apparatus 200 that converts a database, e.g., DB2, of a mainframe system 100 into an appropriate database, e.g., Oracle, for an open system 300 roughly comprises a data extraction module 210, a code conversion module 220, and a data transfer module 230.

Here, the mainframe system 100 processing company data is industrial terminology indicating a large scale computer manufactured by a large company, e.g., IBM Corporation. The mainframe system 100 is mainly used for performing computations required for the business activities of large companies, such as large corporations and financial institutions, and is configured according to a centralized computing method rather than a distributed computing method.

Meanwhile, the open system 300 is industrial terminology indicating a method designed for enabling a link between hardware (H/W) and software (S/W) of different computer manufacturing companies, and is capable of being classified according to operating system, communication technique, and so on. The open system 300 mentioned here is a medium-scale computer having an operating system, e.g., UNIX, Linux, or so on.

The data extraction module 210 is connected with the database of the mainframe system 100 and functions to extract data composed of Extended Binary Coded Decimal Interchange Code (EBCDIC) in binary format.

The code conversion module 220 functions to convert the EBCDIC data extracted by the data extraction module 210 into American Standard Code for Information Interchange (ASCII) code.

In addition, the code conversion module 220 functions to convert full-width characters to half-width characters corresponding to ASCII code using a previously set full-width/half-width conversion table.

In addition, the code conversion module 220 functions to convert the value of X'00' into an ASCII code corresponding to SPACE(X'20') during code conversion.

In addition, the code conversion module 220 functions to convert a character string including shift-outs (SOs) and shift-ins (SIs) by removing the SOs and the SIs from the character string and then moving letters behind the SOs forward to fill empty spaces leftover by removing the SOs and the SIs during code conversion.

In addition, the code conversion module 220 functions to convert special characters, e.g., CR, LF, ^, >, <, +, \, [, ], etc., to correspond to ASCII code using a previously set special-character code conversion table.

The data transfer module 230 functions to receive the data converted into ASCII code from the code conversion module 220 and transfer and store it in the database that is previously built in the open system 300 to correspond to the database of the mainframe system 100.

FIG. 2 is a flowchart illustrating a migration method of converting a database of a mainframe system into an appropriate database for an open system according to an exemplary embodiment of the present invention.

Referring to FIGS. 1 and 2, first, environments of a database, e.g., Oracle, are previously implemented in the open system 300 to correspond to environments, e.g., table name, column name, column type, column length, data characteristics, etc., of a database, e.g., DB2, used in the mainframe system 100.

Then, data composed of EBCDIC is extracted in binary format from the database of the mainframe system 100 by the data extraction module 210 (step 100).

Subsequently, the EBCDIC data extracted in step 100 is converted into ASCII code by the code conversion module 220 (step 200).

Here, full-width characters, e.g., Korean characters, etc., are converted into half-width characters corresponding to ASCII code using a previously set full-width/half-width conversion table.

However, during code conversion, problems relating to reconciliation of migration data and application operation are caused by difference in Null or X'00' value processing between the database of the mainframe system 100 and the database of the open system 300.

Therefore, the value of X'00' existing in the database of the mainframe system 100 is converted into an ASCII code corresponding to SPACE(X'20').

Meanwhile, Null means that there is a column but no data, and X'00' means a value "00" in hexadecimal notation.

In addition, during code conversion, a character string including SOs and SIs is converted by removing the SOs and the SIs from the character string and then moving letters behind the SOs forward to fill empty spaces leftover by removing the SOs and the SIs.

In addition, special characters, e.g., CR, LF, ^, >, <, +, \, [, ], etc., are converted to correspond to ASCII code using a previously set special-character code conversion table.

Finally, the data converted into ASCII code in step 200 is transferred to be stored in the database that is previously built in the open system 300 to correspond to the database of the mainframe system 100 (step 300).

Meanwhile, as for a table including full-width/half-width conversion data, when the data converted into ASCII code in step 200 is stored in the database previously built in the open system 300, a temporary table is generated in advance in the database of the open system 300, and the data of the table is first stored in the generated temporary table. Otherwise, while the data of the table is being converted using a full-width/half-width conversion module (not shown in the drawings), the converted data is inserted into the database of the open system 300.

Here, the full-width/half-width conversion module is made up by basically using a function provided by the database of the open system 300 and coding a non-converted part of full-width data.

Meanwhile, the migration method of converting a database of a mainframe system into an appropriate database for an open system according to an exemplary embodiment of the present invention can be stored on a computer-readable recording medium in the form of computer code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a nonvolatile memory (flash memory), an optical data storage device, and so on. Also, the recording medium may be carrier waves, e.g., transmission over the Internet.

In addition, the computer-readable recording medium may be distributed among computer systems connected via a communication network and stored in the form of a code that can be read and executed by a de-centralized method.

While the invention has been shown and described with reference to certain exemplary embodiments of a migration apparatus and method for converting a database of a mainframe system into an appropriate database for an open system, it will be understood by those skilled in the art that various changes in form and details may be made therein without departing from the spirit and scope of the invention as defined by the appended claims.

The invention claimed is:

1. A migration apparatus for converting a database of a mainframe system into an appropriate database for an open system, the migration apparatus comprising:
   a computer system comprising at least one processor and at least one computer readable medium, the at least one computer-readable medium comprising:
   a data extraction module connected with a database of the mainframe system and extracting data composed of Extended Binary Coded Decimal Interchange Code (EBCDIC) in binary format;
   a code conversion module converting the extracted EBCDIC data into American Standard Code for Information Interchange (ASCII) code, full-width characters being converted into half-width characters corresponding to ASCII code using a previously set full-width/half-width conversion table; and
   a data transfer module for transferring data which has been converted into ASCII code by the code conversion module, the data transfer module configured to:
   generate a temporary table in the database of the open system;
   store the data, in the form of ASCII code, in the temporary table;
   replace all full-width characters enclosed in the data stored in the temporary table with corresponding half-width characters, as determined by the code conversion module; and
   transfer the data stored in the temporary table to a database previously built in the open system to correspond to the database of the mainframe system;
   wherein at least the data transfer module and code conversion module are external to both of the mainframe system and the open system;
   wherein the code conversion module converts a value of '00' into an ASCII code corresponding to space during code conversion; and
   wherein the code conversion module converts a character string including shift-outs (SOs) and shift-ins (SIs) by removing the SOs and SIs from the character string and then moving letters behind the SOs forward to fill empty spaces leftover by removing the SOs and the SIs during code conversion.

2. The migration apparatus of claim 1, wherein the code conversion module converts special characters to correspond to ASCII code using a previously set special-character code conversion table.

3. A migration method of converting a database of a mainframe system into an appropriate database for an open system, the migration method comprising the steps of:
   (a) extracting data composed of Extended Binary Coded Decimal Interchange Code (EBCDIC) in binary format from a database of the mainframe system;
   (b) converting the extracted EBCDIC data into American Standard Code for Information Interchange (ASCII) code, full-width characters being converted into half-width characters corresponding to ASCII code using a previously set full-width/half-width conversion table; and
   (c) transferring the data converted into ASCII code in step (b) to a database previously built in the open system to correspond to the database of the mainframe system, wherein step (c) includes:
   (c1) generating a temporary table in the database of the open system;
   (c2) storing the data, in the form of ASCII code, in the temporary table;
   (c3) replacing all full-width characters enclosed in the data stored in the temporary table with corresponding half-width characters, as determined in step (b); and
   (c4) moving the data stored in the temporary table to the database previously built in the open system,
   wherein at least steps (b) and (c) are performed in an apparatus external to both of the mainframe system and the open system;
   in step (b), a value of '00' is converted into an ASCII code corresponding to space during code conversion; and
   in step (b), a character string including shift-outs (SOs) and shift-ins (SIs) is converted by removing the SOs and SIs from the character string and then moving letters behind the SOs forward to fill empty spaces leftover by removing the SOs and the SIs during code conversion.

4. The migration method of claim 3, wherein in step (b), special characters are converted to correspond to ASCII code using a previously set special-character code conversion table during code conversion.

5. A non-transitory computer-readable recording medium storing a program configured to execute the migration method of claim 3 or 4.

* * * * *